United States Patent [19]

Riti et al.

[11] Patent Number: 4,817,256

[45] Date of Patent: Apr. 4, 1989

[54] AUTOMATIC MACHINE FOR FORMING INDUCTION WINDINGS IN THE ROTOR SLOTS OF DYNAMO-ELECTRIC MACHINES

[75] Inventors: Gionfranco Riti, Vasto; Mario Scampoli, Pollutri, both of Italy

[73] Assignee: Industrie Magneti Marelli S.r.l., Milan, Italy

[21] Appl. No.: 81,392

[22] Filed: Aug. 4, 1987

[30] Foreign Application Priority Data

Aug. 4, 1986 [IT] Italy ................................ 67629 A/86

[51] Int. Cl.[4] ........................................... H02K 15/09
[52] U.S. Cl. ...................................... 29/33 L; 29/598; 29/736; 242/7.05 B
[58] Field of Search ............... 29/33 L, 564.5, 564.6, 29/564.8, 566.1, 598, 732, 733, 735, 736; 242/7.04, 7.05 R, 7.05 A, 7.05 B

[56] References Cited

U.S. PATENT DOCUMENTS

| | | | |
|---|---|---|---|
| 1,690,336 | 11/1928 | Elsey | 29/736 |
| 3,455,009 | 7/1969 | Moore | 29/735 |
| 3,785,583 | 1/1974 | Biddison | 29/735 |
| 4,236,300 | 12/1980 | Kartavsev et al. | 29/33 L |
| 4,671,465 | 6/1987 | Lemley et al. | 29/598 |

FOREIGN PATENT DOCUMENTS 551340 10/1956 Belgium .

Primary Examiner—Gil Weidenfeld
Assistant Examiner—Daniel W. Howell
Attorney, Agent, or Firm—Sughrue, Mion, Zinn, Macpeak, and Seas

[57] ABSTRACT

An automatic machine for forming induction windings in the axial slots of rotors of dynamo-electric machines, such as electric motors, alternators and the like, comprises a wire-guiding unit for supplying an array of conductor wires to a winding station at which motor-driven take-up means operate to engage the radially innermost ends of the wires, and chuck means for gripping the shaft of the rotor and effecting the operating cycle of forming the windings. The take-up means have associated motor-driven cutting means for cutting the ends of the wires at the end of a cycle, and a member for attachment to the shaft of the rotor to drive the translation and rotation of the take-up means from the chuck means during the forming cycle. The machine also includes automatic motor-driven loading and unloading means for the rotors and electronic means for controlling the wire-guiding unit, the take-up means, the chuck means, the cutting means and the loading and unloading means in a completely automated operating sequence.

10 Claims, 15 Drawing Sheets

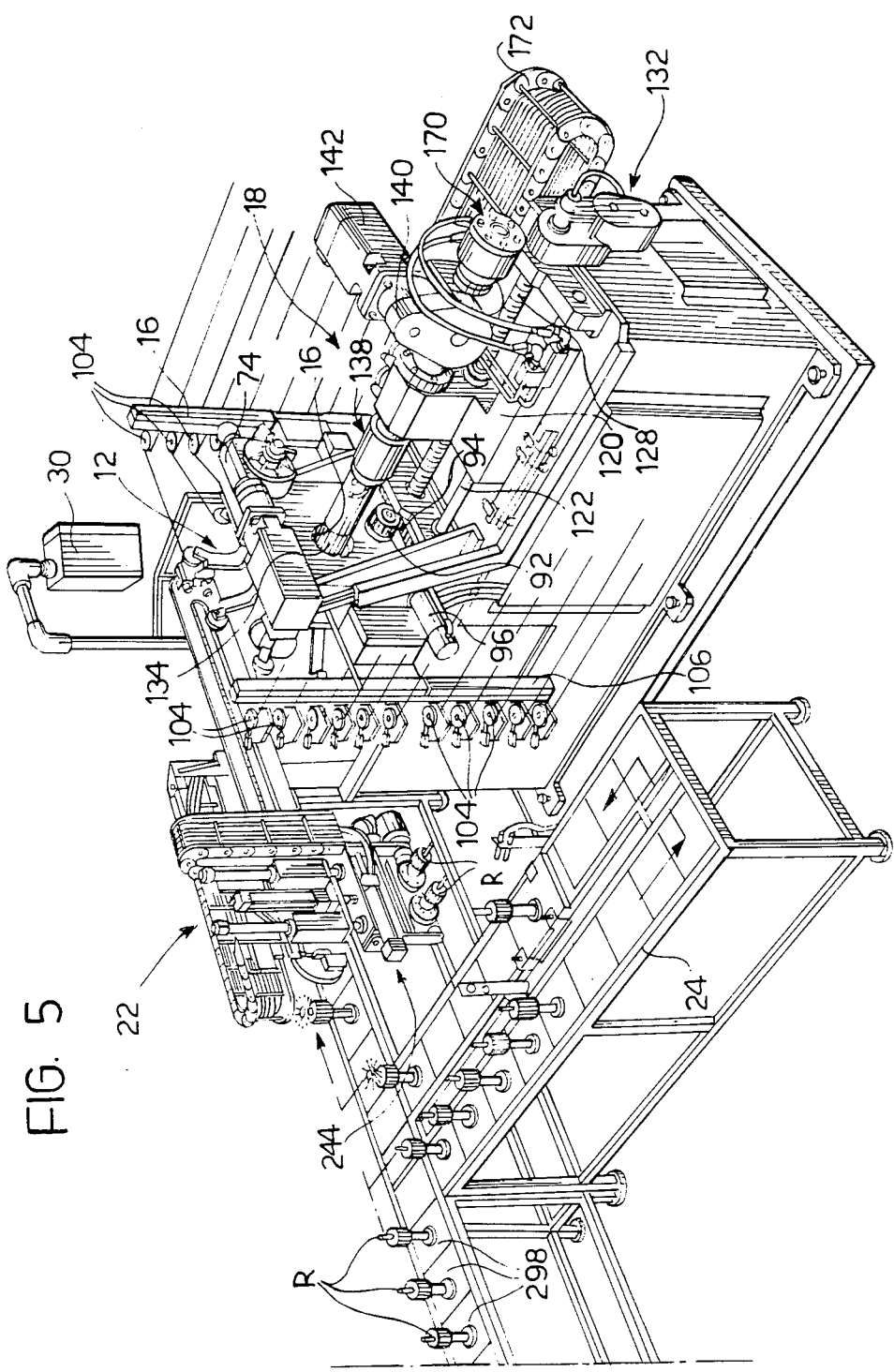

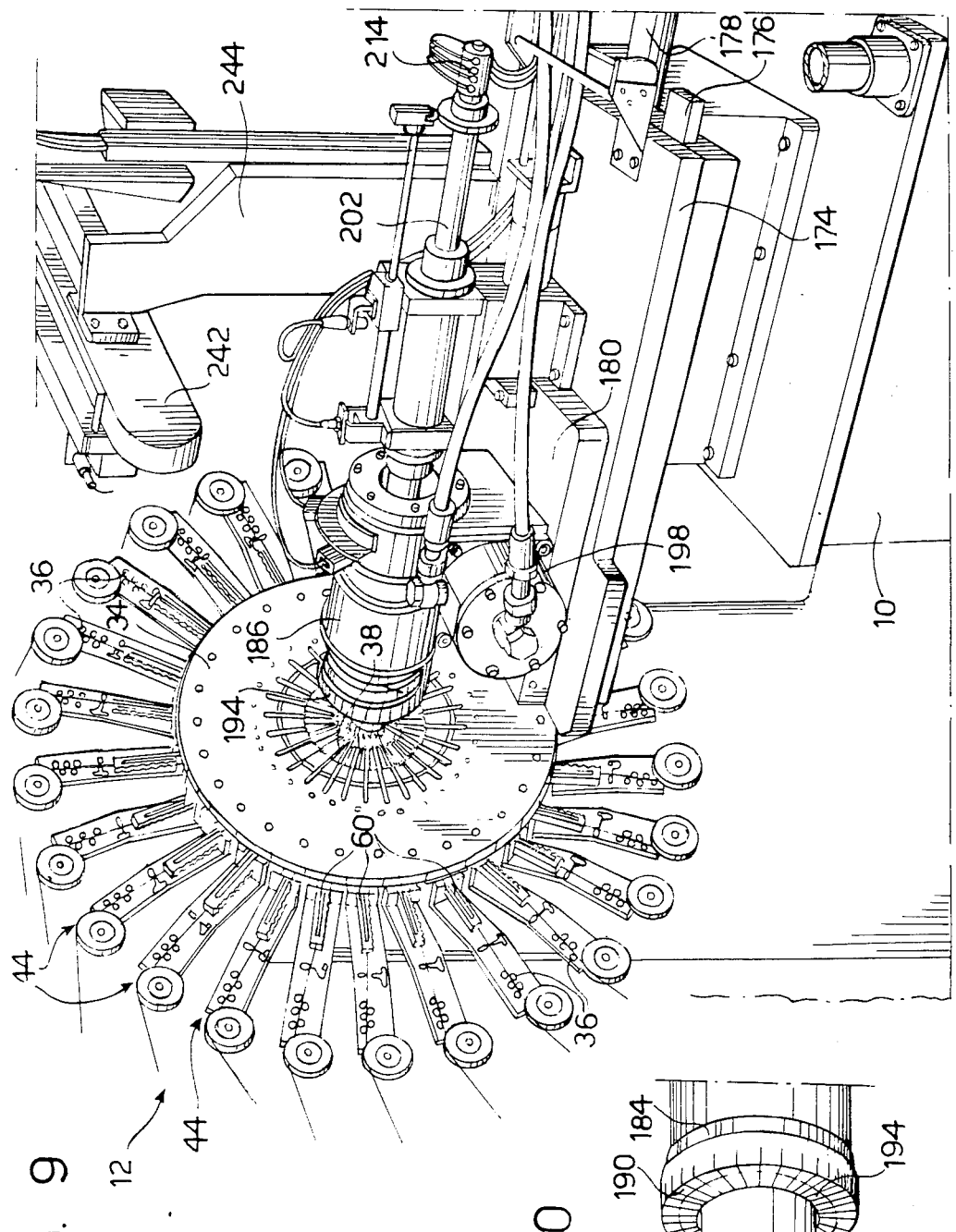

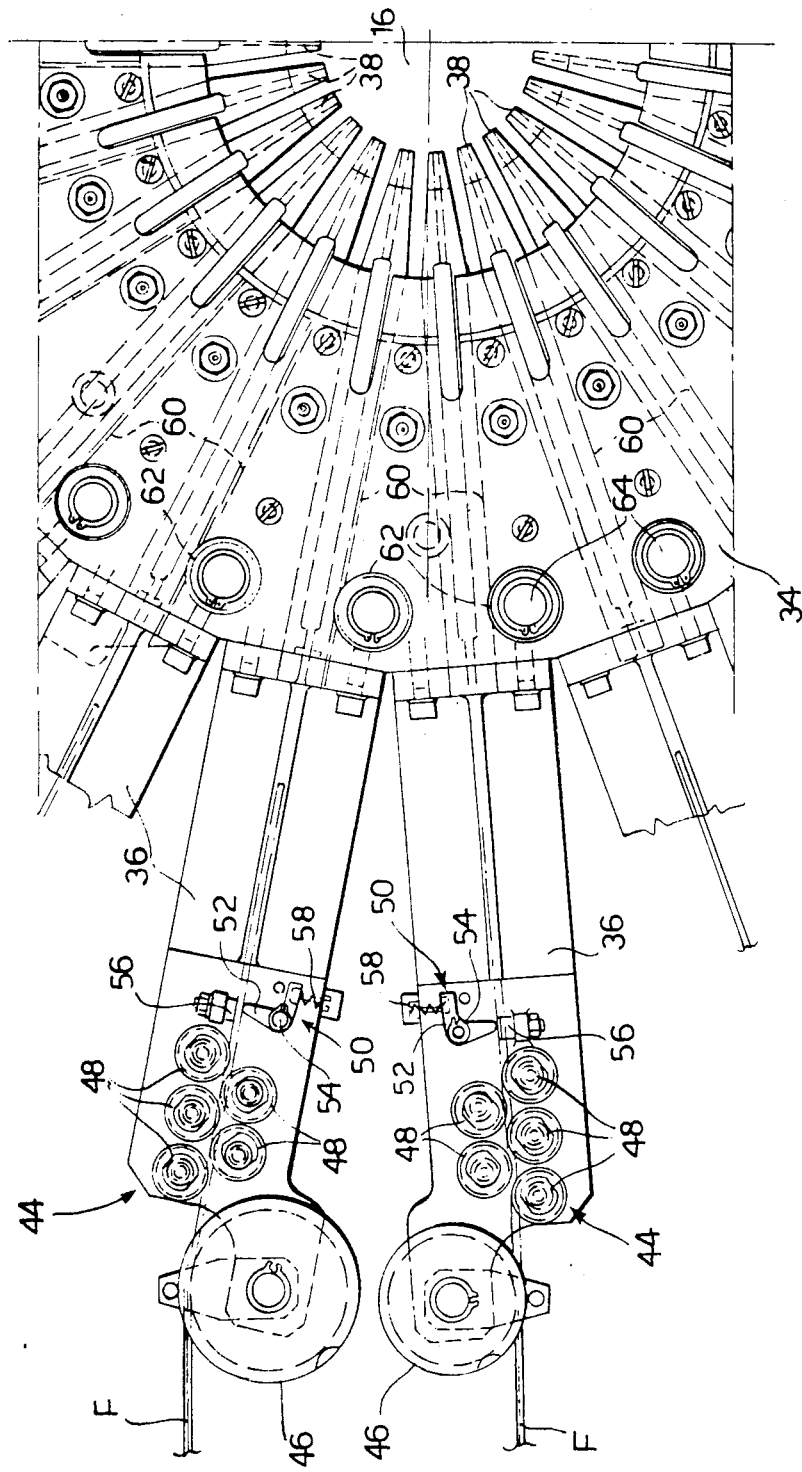

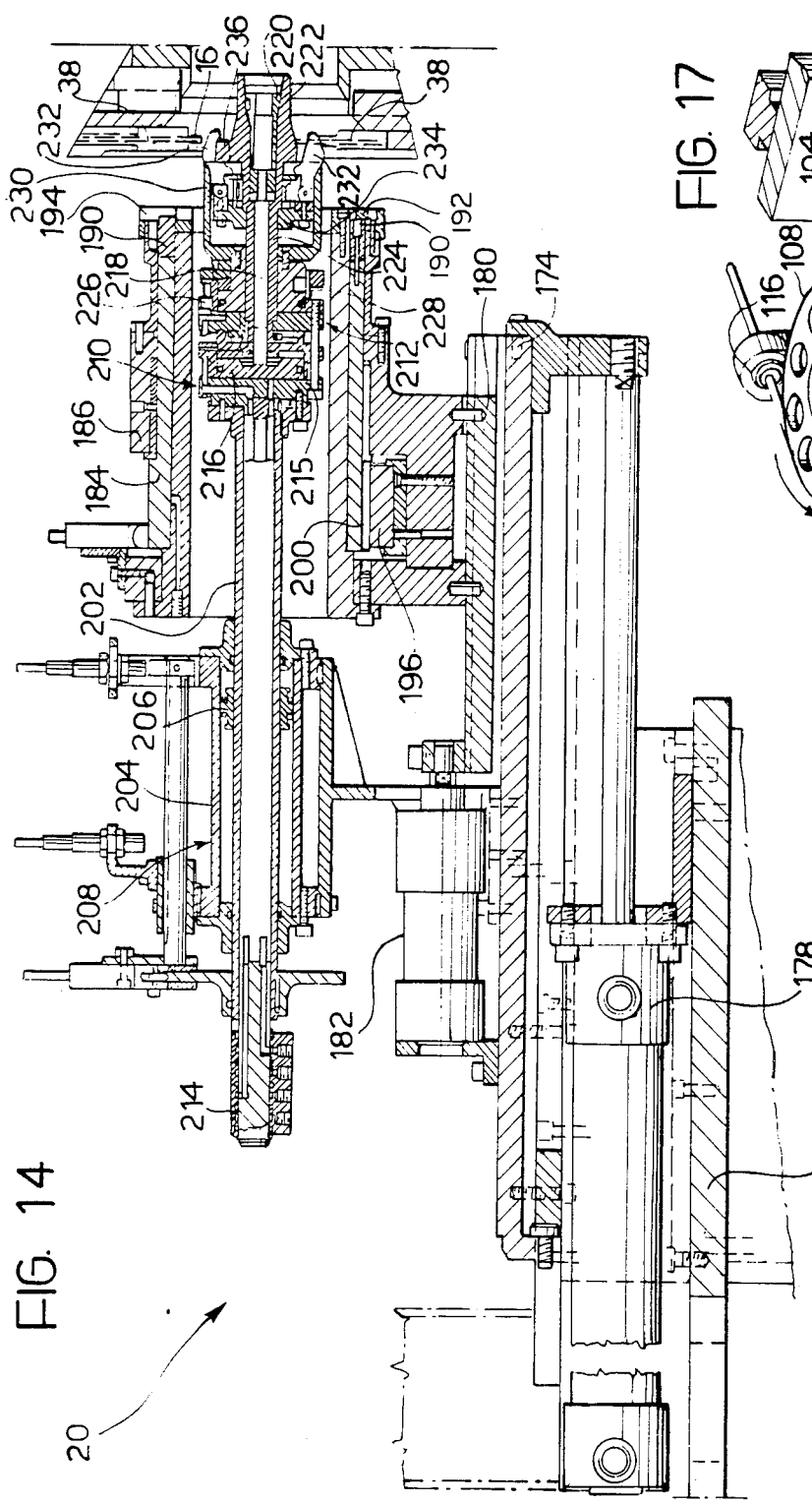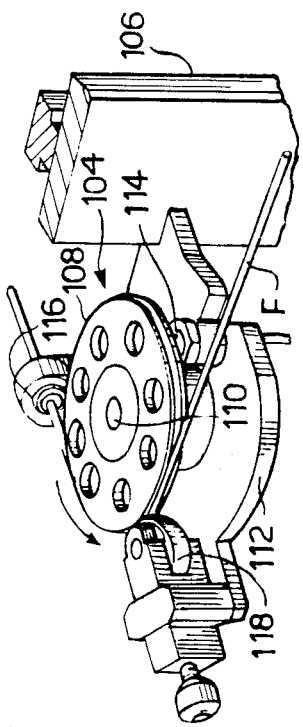

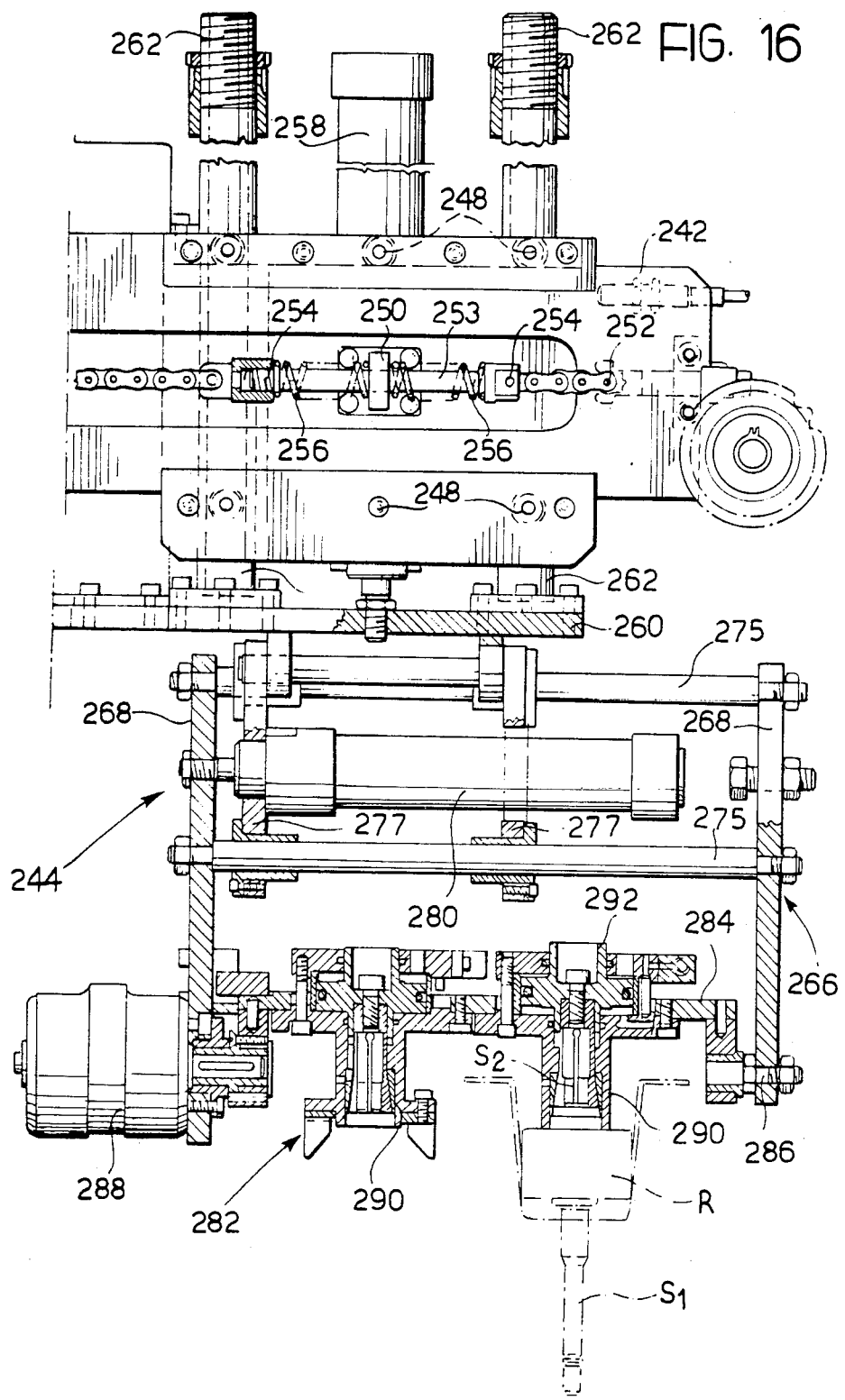

AUTOMATIC MACHINE FOR FORMING INDUCTION WINDINGS IN THE ROTOR SLOTS OF DYNAMO-ELECTRIC MACHINES

The present invention relates in general to the forming of induction windings in the axial slots of rotors of dynamo-electric machines, such as electric motors, alternators and the like.

More particularly, the invention relates to a machine for forming such windings, of the type including a motor-driven wire-guiding unit with a horizontal axis for the controlled supply of an array of conductor wires wound on spools from a magazine to a winding station at which take-up means operate to engage the radially innermost ends of the wires, and chuck means for gripping the shaft of the rotor which is translatable longitudinally of the axis of the wire-guiding unit and rotatable about this axis in synchronism with the operation of the wire-guiding unit in an operative forming cycle during which each wire is deposited longitudinally within a respective first slot of the rotor, wound transversely at one end of the rotor between the first slot and a second slot which is not adjacent the first slot, deposited longitudinally within the second slot, wound transversely at the other end of the rotor between the second and first slots, redeposited longitudinally within the first slot, rewound transversely at the end of the rotor between the first and second slots, and redeposited longitudinally within the second slot, and in which there are provided radial pusher means associated with the wire-guiding unit for arranging the longitudinal portions of the wires within the respective slots, and cutting means for cutting the ends of the wires projecting from the second slots of the rotor at the end of the cycle and for forming these end parts into bent hooks adapted to cooperate with the take-up means in the subsequent cycle.

In known machines of the type specified above, produced and used by the applicants for some time, the operative forming cycle requires a great deal of human intervention due to the fact that many stages in the cycle must necessarily be carried out manually by skilled workmen. These steps are the taking-up and correct positioning of the rotors at the winding station, the activation of the chuck means for gripping the shaft of the rotors and the wire-guiding unit for effecting a first cycle of angular phasing and supply of the wires, the stoppage of the cycle and the introduction of take-up means constituted by a manual tool for engaging the ends of the wires, the subsequent re-starting of the machine, and finally the removal and discharge of the rotor with the winding formed.

The operative forming cycle is clearly long and complex, and the final result is linked to a substantial extent to the skill of the workmen.

Furthermore, these machines have poor flexibility in that they are arranged to work with rotors of predetermined dimensions and their adaptation to rotors of different dimensions requires long and complicated operations for replacement of a multiplicity of members, which involves long down-times.

The object of the present invention is to avoid these disadvantages and to provide a forming machine of the type defined at the beginning which can carry out a totally automatic forming cycle without any direct manual intervention and with considerably shorter operating times, and which can also be adapted easily to rotors of different dimensions.

In order to achieve this object, the present invention provides a forming machine of the type specified above, characterized in that the take-up means for the ends of the wires comprise an annular gripper member having motor-driven means for its activation and deactivation, and means for translating the wire-guiding unit along the axis from the end opposite the chuck means relative to the winding station, the gripper member having an associated member for attachment to the shaft of the rotor at the end opposite the chuck means, provided with motor-driven activation and deactivation means and arranged to drive the translation and rotation of the gripper member from the chuck means during the forming cycle, and in that the machine further includes motor-driven loading and unloading means for supplying the rotors to the winding station and removing them therefrom, respectively, in synchronism with the operation of the chuck means and the take-up means, and electronic means for controlling the wire-guiding unit, the take-up means, the chuck means, the cutting means, and the loading and unloading means in an automatic operating sequence.

According to the invention, the gripper member and the attachment member form part of a motor-driven unit carrying the cutting means.

According to another advantageous characteristic of the invention, the magazine for supplying the conductor wires includes pillar support members provided with brackets for supporting the spools of wire disposed with axes substantially horizontal in substantially vertical rows, and each spool has an associated rotatable member for passing the wire towards the wire-guiding unit provided with phonic-wheel signalling to indicate any anomalies in the supply.

Further characteristics and advantages of the invention will become evident during the detailed description which follows with reference to the appended drawings, provided purely by way of non-limiting example, in which.

Figure 1:
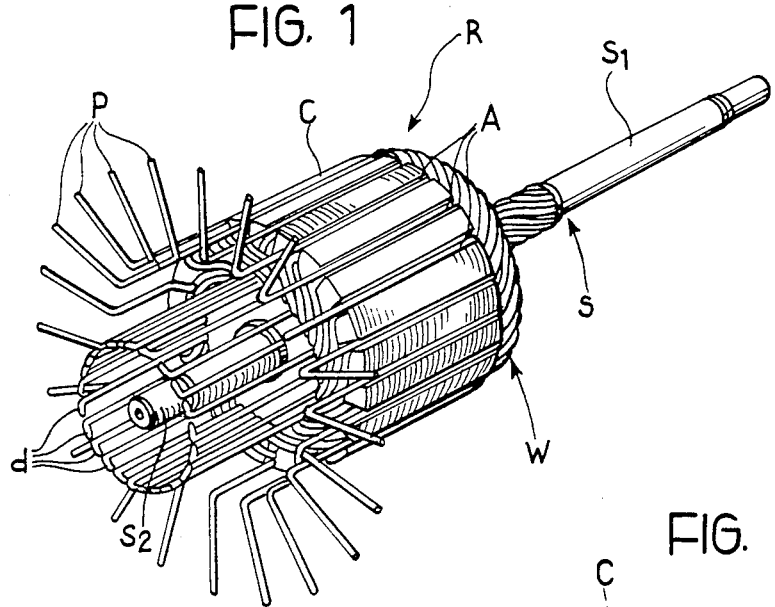
FIG. 1 is a perspective view of a rotor for dynamo-electric machines, provided with an induction winding formed by the machine according to the invention.
Figure 3:
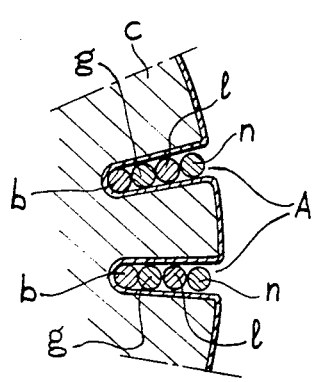
Figure 4:
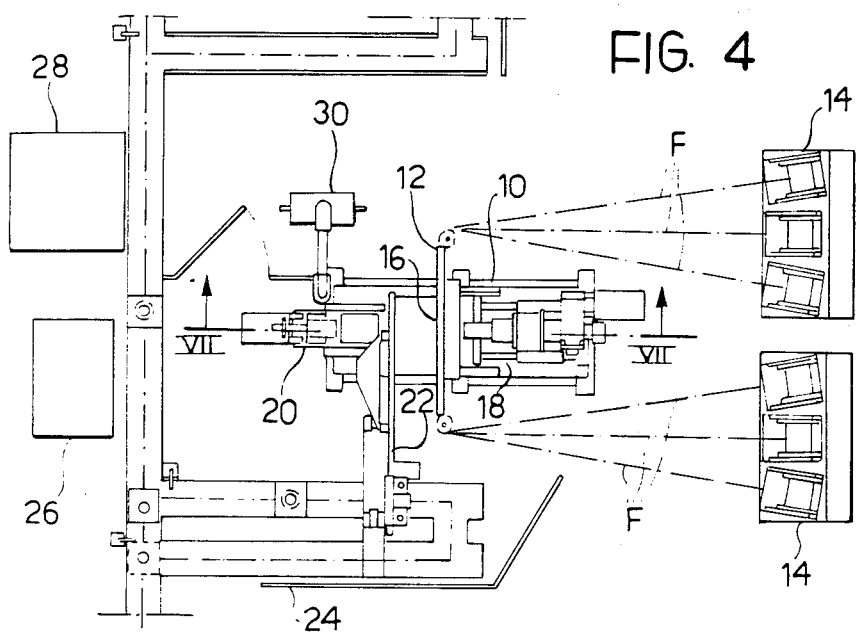
Figure 15:
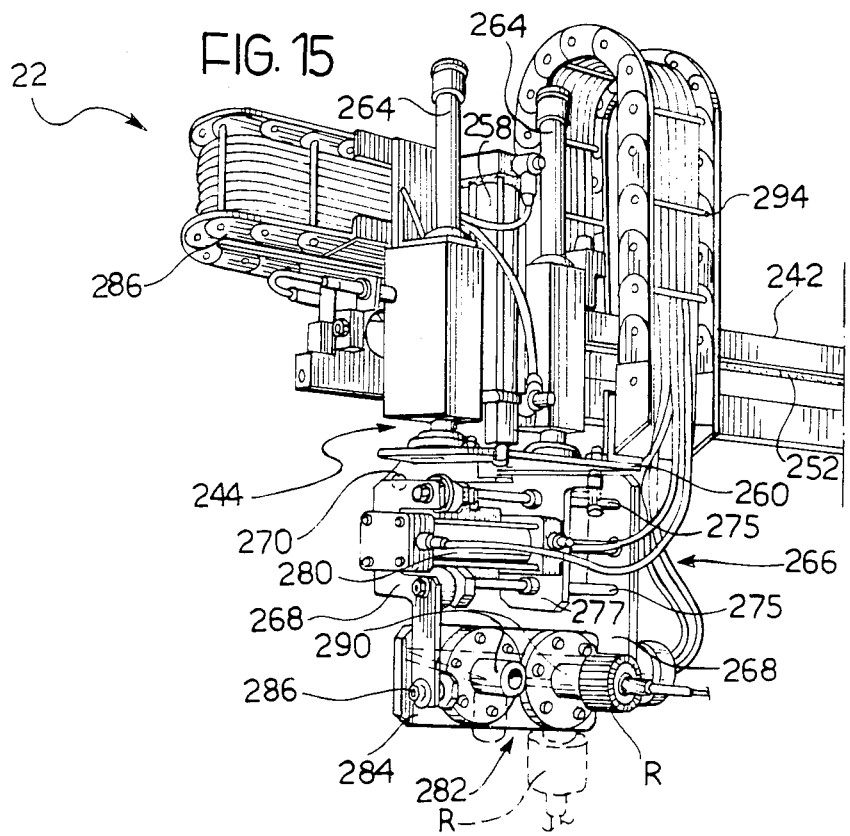
Figure 6:
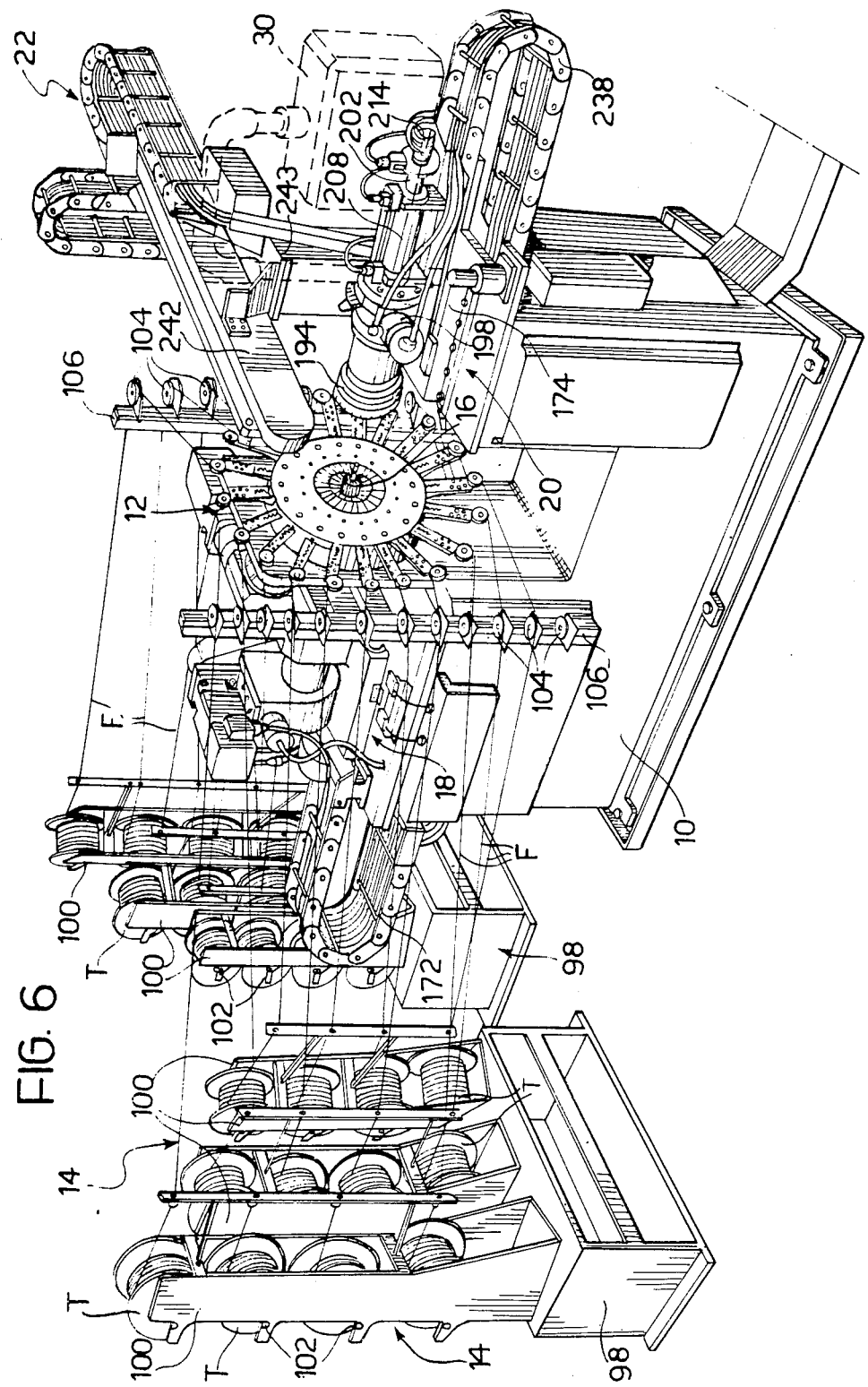
Figure 7:
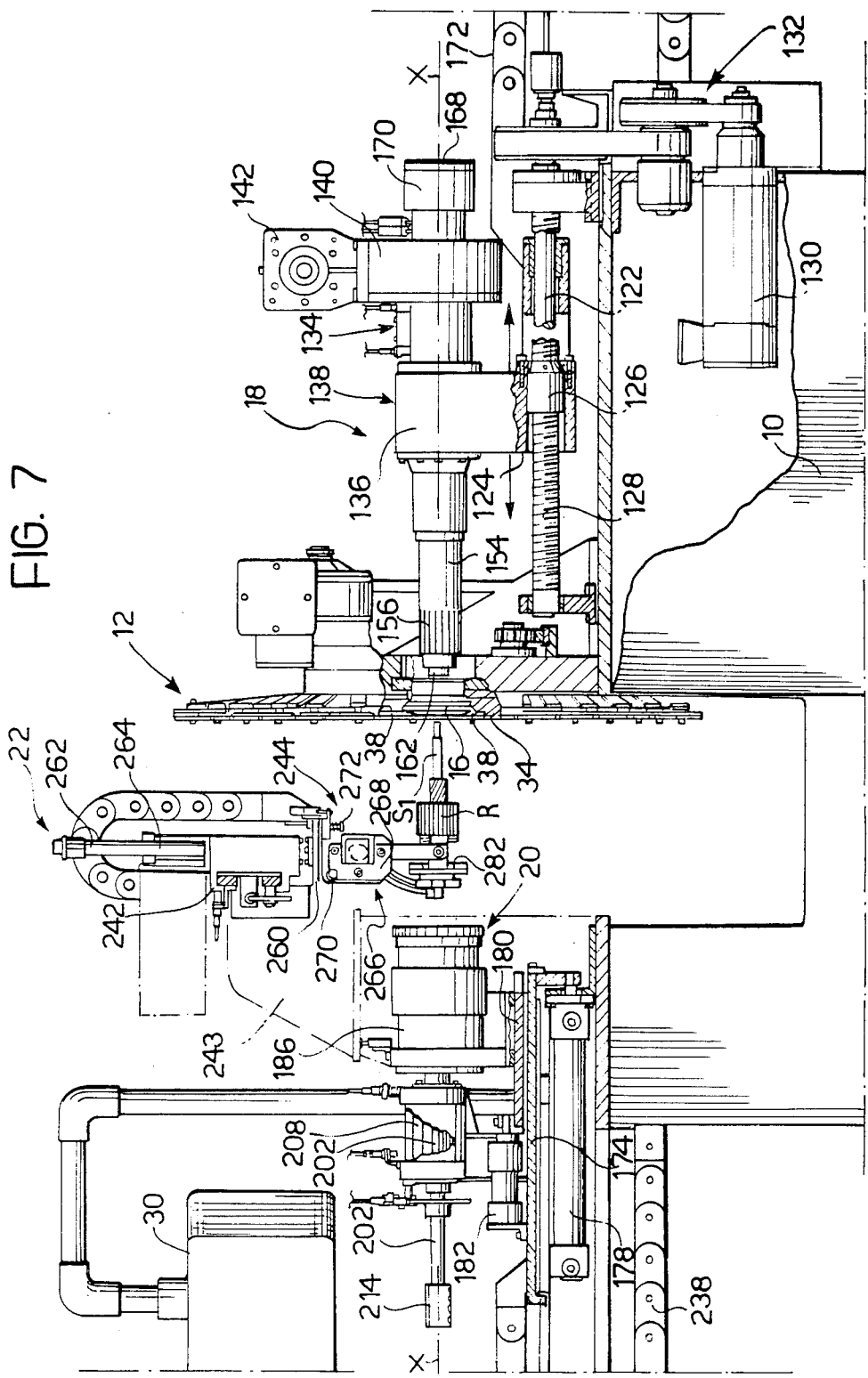
Figure 8:
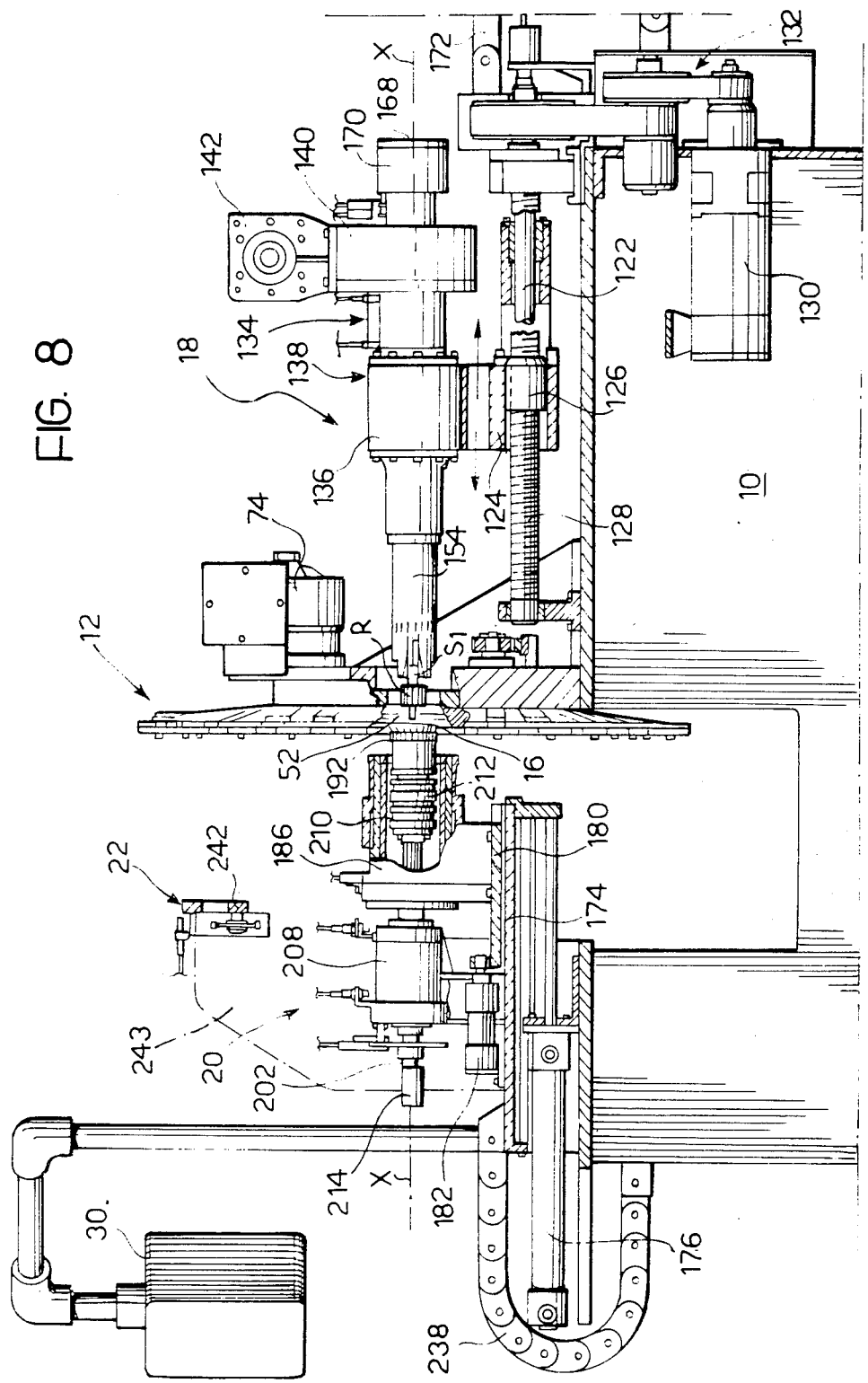
Figure 12:
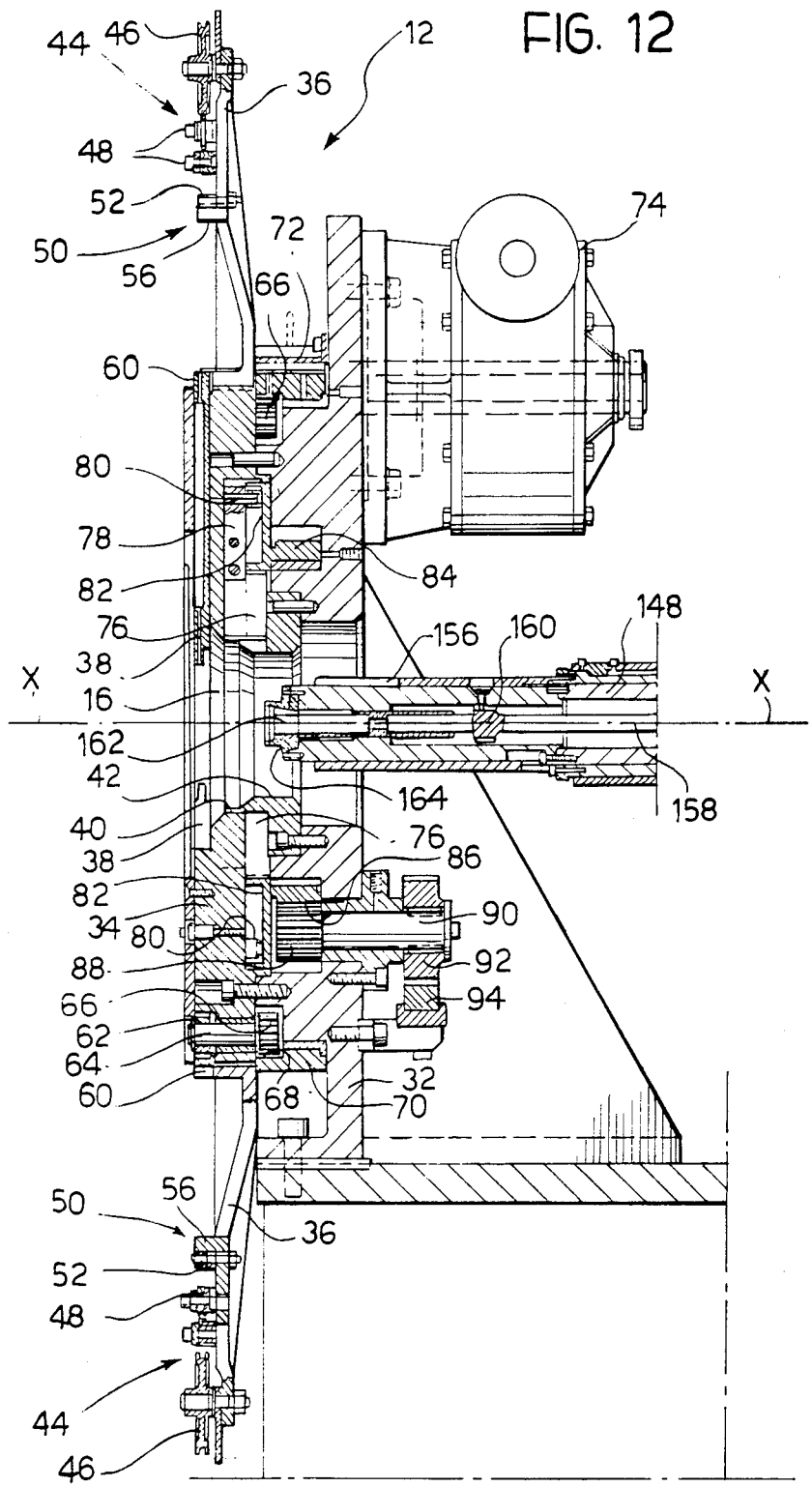
Figure 13:
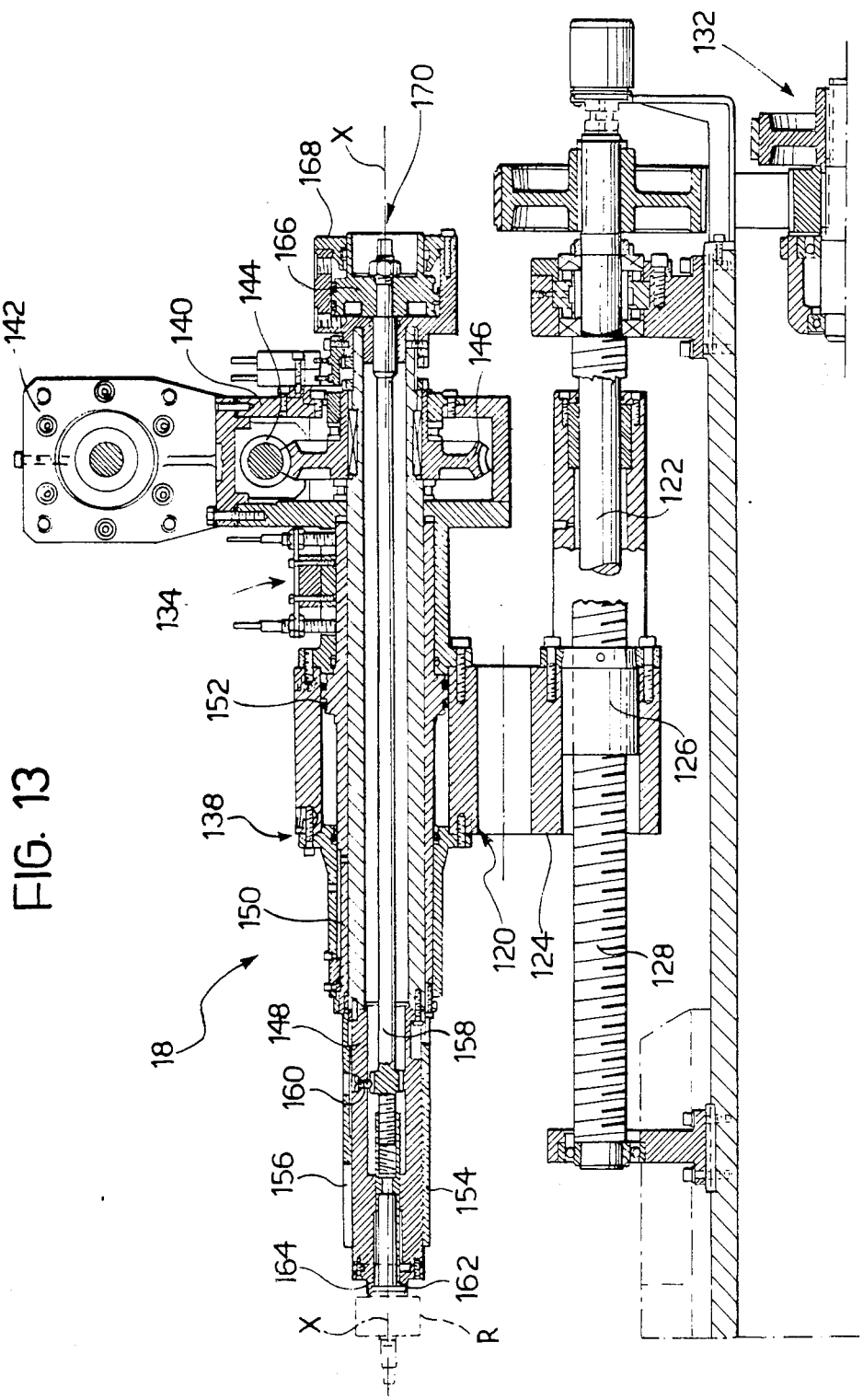
Figure 24:
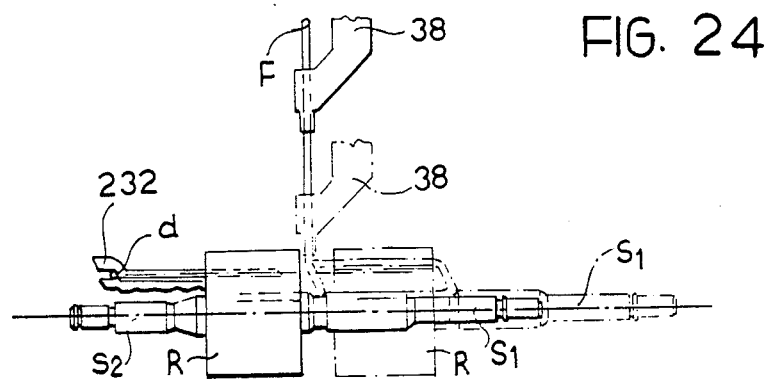
Figure 25:
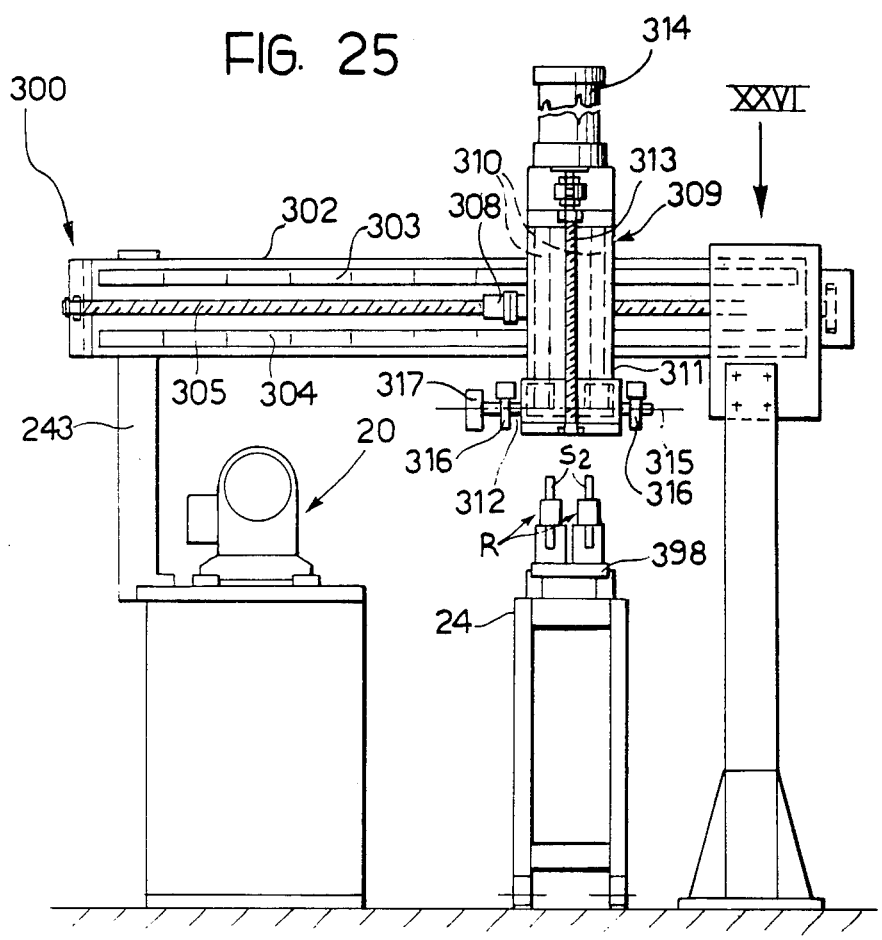
Figure 26:
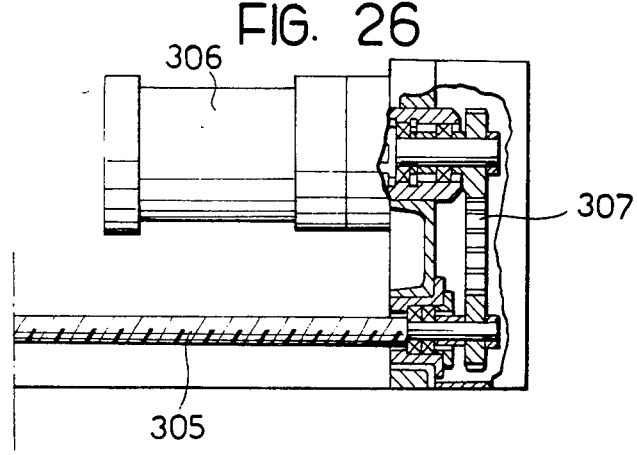

FIG. 3 is a cross-sectional view on an enlarged scale, taken on the line III—III of FIG. 1, FIG. 4 is a diagrammatic plan view of the forming machine of the invention, FIG. 5 is a front perspective view of the machine, FIG. 6 is a rear perspective view of the machine, FIG. 7 is a partial longitudinal section taken on the line VII—VII of FIG. 4, on an enlarged scale, during a first phase of the winding cycle, FIG. 8 is a view similar to FIG. 7 during a subsequent phase of the winding cycle, FIG. 9 illustrates part of FIG. 6 on an enlarged scale, FIG. 10 is a perspective view of a detail of FIG. 9 from another angle, FIG. 11 is a partial front elevational view of a detail of FIG. 9, on an enlarged scale, FIG. 12 illustrates part of FIGS. 7 and 8 on an enlarged scale, FIG. 13 illustrates another detail of FIGS. 7 and 8 on an enlarged scale, FIG. 14 illustrates a further detail of FIGS. 7 and 8 on an enlarged scale, FIG. 15 illustrates a detail of FIG. 5 on an enlarged scale, FIG. 16 is a partially sectioned rear elevational view of FIG. 15 on an enlarged scale, FIG. 17 is a perspective view illustrating a detail of FIG. 6 on an enlarged scale, FIGS. 18 to 24 are seven diagrammatic views illustrating part of FIGS. 7 and 8 (forming station) on an enlarged scale, during the different successive steps in the operative forming cycle of the machine, FIG. 25 is a diagrammatic front elevational view of a variant of FIG. 5, and FIG. 26 is a partially sectioned plan view taken on the arrow XXVI of FIG. 25.

Figure 2:
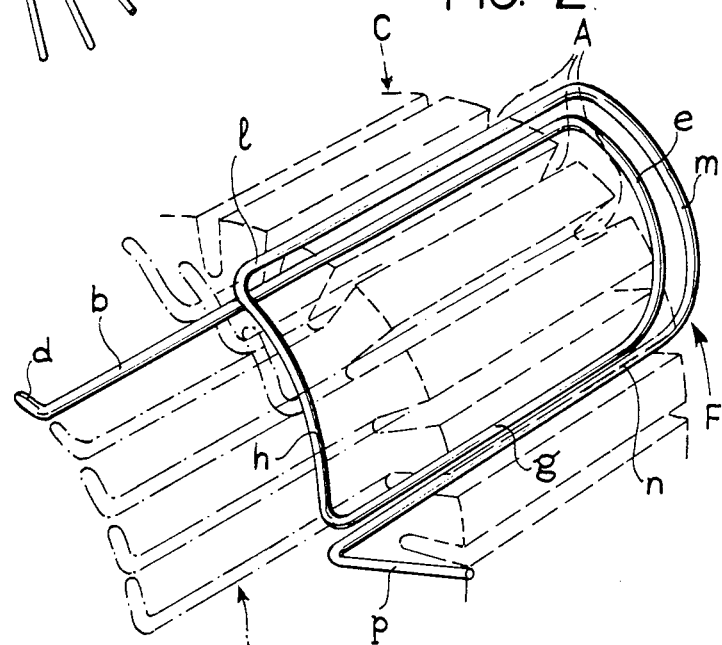
FIG. 2 is a perspective view of a detail of the winding on an enlarged scale.

With reference initially to FIGS. 1 to 3, a rotor or armature for dynamo-electric machines, such as electric motors, alternators and the like, is generally indicated R and includes a cylindrical body C constituted by an axial pack of blanked sheets shaped so as to define a circumferential series of equiangularly-spaced axial slots or recesses A in the body C (in the embodiment illustrated there are 23).

The body C is mounted on a shaft S having a longer rear portion $S_1$ and a shorter front portion $S_2$ projecting axially from the body C.

The rotor R carries an induction winding W formed in the manner described below by the machine of the invention. This winding W is formed, in effect, by a series of off-cuts F of thick conductor wire, each of which is bent and disposed in the configuration illustrated in detail in FIG. 2. Each off-cut F of wire has an initial axial portion b with an end bent into a hook d which projects from one end of the body C parallel to the portion $S_2$ of the shaft S and through one of the axial slots A close to its bottom. The end of the first axial portion b opposite the hook end d is bent circumferentially relative to the body C, forming a first transverse portion e which extends close to the end of the body C located nearer the portion $S_1$ of the shaft S between the first axial slot A and a second axial slot A which is not adjacent the first, for example, the fourth subsequent slot. The transverse portion e is bent to form an axial portion g which extends longitudinally within the second slot A in contact with the longitudinal portion b of another off-cut F.

The longitudinal portion g is bent close to the end of the body C located nearer the portion $S_1$ of the shaft S, forming a transverse portion h which extends between the second slot A and the first slot A. The portion h is bent axially to form a second axial portion l which again traverses the first slot A in contact with the portion g of another off-cut F. The axial portion l is also bent circumferentially to the end of the body C disposed nearer the portion $S_1$ of the shaft S and forms a second transverse portion m extending between the first and second slots A and again bent axially to form a second longitudinal portion n which extends within the second slot A against the longitudinal portion l of the other wire off-cut F. The free end of the longitudinal portion n projects from the end of the body C nearer the portion $S_2$ of the shaft S, with an end part p bent radially outwardly.

It is thus clear that each wire off-cut F shaped in the manner described above co-penetrates the other wire off-cuts F to achieve continuity of the electrical connection between these off-cuts. FIG. 3 illustrates the arrangement of the corresponding portions of four different wire off-cuts F in two adjacent axial slots A: the longitudinal portions b and l of the first slot A (the upper one with reference to the drawing) belong to a first wire off-cuts. F and alternate with portions g and n of a second wire off-cut F, and an identical arrangement is present in the second slot A (the lower one with reference to the drawing) in which the portions p and l of a third wire off-cut F alternate with the portions g and n of a fourth off-cut.

The winding W formed in accordance with the above is achieved by the forming machine of the invention, generally indicated 6 in FIG. 4.

With reference to this Figure, the machine consists essentially of a support framework 10 carrying at its center a wire-guiding unit 12 which receives the wires F from a magazine 14 and defines a winding station 16 at which a main unit 18 and auxiliary unit 20 operate on opposite sides of the wire-guiding unit 12. The machine also includes a loading/unloading unit 22 associated with a conveyor and accumulation line 24 for feeding rotors R to the winding station 16 and unloading them therefrom, a unit 26 for supplying and distributing pressurized fluid, and an electrical cubicle 28 connected to a programmable electronic control unit 30.

The components listed above will now be described in detail below.

Wire-guiding unit 12

With reference in greater detail to FIGS. 6 and 9 to 12, the wire-guiding unit 12 comprises a vertical support plate 32 which is supported by the framework 10 and to which is fixed a substantially circular front plate 34 having a series of radial arms 36 fixed to its periphery, each of which has an associated respective radial wire guide 38 mounted slidably relative to the plate 34. The wire guides 38 thus define an array converging towards a central aperture 40 in the plate 34 corresponding to an aperture 42 in the plate 32.

These apertures, whose axis is indicated X, effectively define the forming station 16.

Each arm 36 carries a respective wire-straightening unit 44 having exactly the function of straightening a respective wire F coming, in the manner clarified below, from the magazine 14. Each wire-straightening unit 44 includes an initial guide wheel 46 followed by a series of idle rollers 48 disposed on opposite sides of the path of the wire F. Immediately downstream of the rollers 48 is a one-way clamp 50 formed by a cranked member 52 pivotable about a pin 54 carried by the arm 36 and cooperating at one end with a fixed stop 56 under the action of a compression spring 58 acting on the opposite end of the cranked member 52. Each clamp 50 allows the respective wire F to slide towards the winding station 16 but prevents it from sliding in the opposite direction.

Each wire guide 38 is constituted by a frontally-tapered tubular member carrying an outer longitudinal rack 60 which meshes with a respective pinion 62 carried by one end of an axial pin 64 rotatable in the plate 34. The other end of each pin 64 carries a second pinion 66 and these pinions 66 mesh with an internal gear 68 formed in an annular member 70 rotatably supported by the plate 32 about the axis X.

The annular member 70 has a toothed outer sector 72 operated through a gear not illustrated, by a geared motor 74. Clearly, the operation of the geared motor 74 in one sense or the other causes, by means of the sector 72 and the gear 68 of the annular member 70 and the sprockets 66 and 64 and racks 62, the radial sliding of the wire guide 38 in one sense or the other, respectively.

Each wire guide 38 has a respective associated blade pusher 76 also slidable radially relative to the plate 34.

The blade pushers 76 have radial limbs 78 carrying respective pins 80 engaged within substantially helical cam slots 82 formed in an annular member 84 rotatably supported by the plate 32. The annular member 84 has an outer toothed sector 86 which meshes with a sprocket 88 carried by the inner end of an axial in 90 on the outer end of which is mounted a gear 92 rotated by a rack 94 actuated by a pressurized-fluid jack 96 (FIG. 5). The actuation of the annular member 84 causes the simultaneous radial sliding of the blade pushers 76 towards the winding station 16 and their subsequent return to the starting position illustrated in FIG. 12.

The actuation of the geared motor 74 and the pressurized-fluid actuator 96, like the activation of all the other motor-driven members of the machine, is controlled by an electronic control unit 30 in a completely automated operative sequence, in the manner described below, in response to signals generated by sensor members associated with the motor- driven members. The sensor members are generally conventional and well known to an expert in the art, and will not therefore be described in detail. With regard to the wire-guiding unit 12, it suffices to say that the sensors are arranged to detect the rotation of the annular member 70 (or of the gear meshing with the toothed sector 72) and the translation of the rack 94.

Magazine 14

With reference to FIGS. 5, 6 and 17, the magazine 14 for supplying the conductor wires F to the wire-guiding unit 12 comprise two structures 98 supporting above them pillar creels 100 having support brackets 102 on which rest rotatable spools T carrying coils of wire F. The spools T are thus disposed above one another with their axes horizontal and are located in a zone remote from the winding station 16 so as to be easily accessible to allow ready substitution of exhausted spools T.

The wires F which unwind from the spools T extend substantially horizontally towards the framework 10 and reach the respective wire-straightening units 44 of the wire-guiding units 12 through respective vertical-axis conveyor pulleys 104 carried by two side pillars 104 fixed to the framework 10.

As illustrated in greater detail in FIG. 17, each conveyor pulley 104 is constituted in practice by an apertured wheel acting as a phonic wheel 108 freely rotatably mounted on a pin 110 carried by a bracket 112 fixed to one of the pillars 106 and cooperating with a detector 114 fixed to the bracket 112. The wire F is guided tangentially towards the periphery of the wheel 108 by means of a wire guide 116 and is pressed against the wheel 108 from its other side by a sprung presser roller 118.

The sensors 114 associated with the phonic wheels 108 are connected to the electronic control unit 30 and, by means of the latter, allow any anomalies in the supply of the wires F or to be indicated. In fact, in the event of stoppage of the sliding of a wire F or its exhaustion, the respective phonic .wheel 108 obviously stops rotating and this occurrence is detected and signalled by means of the sensor 114.

Main unit 18

With reference to FIGS. 5 to 8 and particularly 13, the main unit 18 includes a slide support 120 slidable along a pair of guides 122 supported by the framework 10 parallel to the axis X on the rear side of the wire-guiding unit 12. The slide 120 has a central tubular part 124 beneath it, in which is inserted a nut 126 engaged by a screw 128 extending parallel to the two guides 122 and rotated by an electric motor 130 through a toothed belt and pulley transmission, generally indicated 132. The rotation of the screw 128 in one sense or the other causes the translation of the slide 120 in one direction or the other parallel to the axis X.

Above the slide support 120 is fixed a housing 134 forming a cylinder 136 of a pressurized-fluid actuator 138 at one end and a gearbox 140 at its other end. The box 140 supports an electric motor 142 which, through a toothed belt and wheel transmission, not shown, rotates a transverse worm screw 144 meshed with a gear 146 keyed onto a rotatable tubular support 148 the axis of which coincides with the axis X. Coaxially slidable on the tubular support 148 is an external hollow shaft 150 having an integral annular portion 152 sealingly slidable within the cylinder 136. This portion 152 thus constitutes the piston of the pressurized-fluid actuator 138 by means of which the axial movement of the hollow shaft 150 on the tubular support 148 is driven.

The hollow shaft 150 forms a splined sleeve 154 at its end facing the winding station 16, having a circumferential series of axial centering slots 156 disposed like the slots A of the rotors R.

Within the tubular support 148 and coaxial therewith is an inner shaft 158 which is slidable relative to the support 148 and coupled for rotation therewith at 160. At its end facing the winding station 16, the inner shaft 158 carries a radially-contractable, resilient-claw gripping member 162 which cooperates with an end bush 164 with a conical surface fixed to the corresponding end of the tubular support 148. The opposite end of the inner shaft 158 is fixed to a piston 166 slidable in a cylinder 168 of a pressurized-fluid actuator 170, also fixed to the tubular support 148.

The gripper member 162 constitutes a take-up and gripping chuck for the portions $S_1$ of the shafts S of the rotors R supplied at any time to the winding station 16 in a manner clarified below. The portion $S_1$ introduced at any time into the gripper member 162, which is held in the advanced position illustrated in FIG. 13, is gripped by means of the withdrawal of the inner shaft 158 by means of the actuator 170, so as to make the rotor R rigid with the main unit 18. The rotor R is thus translatable by means of the motor 130 and the screw - nut coupling 128,126, and rotatable by means of the motor 142 and the tubular support 148.

Position detector devices, which are conventional and are therefore not described in detail, are provided in this case and are associated with the motors 130 and 142 and the actuators 138 and 170 to indicate to the electronic control unit 30 the configurations assumed by the above-described components of the main unit 18.

As is best seen in FIGS. 5 to 8, this main unit 18 has an associated extensible and contractable support 172 carrying the various electrical conductors and flexible tubes associated with the various motor-driven members and sensors.

Auxiliary unit 20

With reference to FIGS. 6 to 9 and particularly 14, the auxiliary unit 20 comprises a slide support structure 174 slidable parallel to the axis X along prismatic guides 176 carried by the framework 10 on the side opposite the main unit 18 relative to the wire-guiding unit 12. The sliding of the slide 174 is driven by a pressurized-fluid actuator 178.

A secondary slide 180 is slidable on the slide structure 174 parallel to the axis X by means of a second pressurized-fluid actuator 182. A tubular housing 186 is fixed to the secondary slide 180 and a tubular member 184 is coaxially and rotatably inserted therein. The end of the tubular member 184 (the axis of which coincides with the axis X) facing the winding station 16 carries a ring 190 having a circumferential series of blades 192 which are equal in number to the number of slots A in the rotors R, and are arranged to cooperate with a corresponding series of fixed counter-blades 194 fixed to the tubular support 186.

The tubular member 184 carrying the ring 190 with the blades 192 is rotated by means of a rack 196 driven by a pressurized-fluid actuator 198 and meshing with a toothed sector 200 formed on the outside of the tubular member 184.

Within the tubular housing 186 and coaxial therewith is a hollow support shaft 202 slidably and rotatably supported by a cylindrical member 204 fixed to the slide 174. The shaft 202 carries an annular piston 206 sealingly slidable in the cylinder 204 and defining therewith a pressurized-fluid actuator 208 which drives the axial movement of the shaft 202 along the axis X.

At its end facing the winding station 16, the shaft 202 carries first and second pressurized-fluid actuators 210, 212 supplied through a rotary manifold 214 carried by the opposite end of the shaft 202.

The first actuator 210 comprises a cylinder 215 fixed to the shaft 202 and in which is reciprocable a piston 216 having a rod 218 to the free end of which is connected a claw gripper member 220 for the attachment, in the manner clarified below, of the portion $S_2$ of the shafts S of the rotors R. The claw gripper 220 cooperates with a sleeve 222 with a conical surface carried by a hollow shaft 224 surrounding the shaft 218 and fixed axially to the cylinder 226 of the second actuator 212. Within the cylinder 226 fixed to the tubular shaft 202 is reciprocable an annular piston 228 to which is fixed a cup member 230 which cooperates with a circumferential series of axial take-up members 232 pivotably supported by an annular hub 234 fixed to the tubular shaft 222. In the withdrawn condition of the cup member 232 illustrated in FIG. 14, the take-up members 232 are held in radially divergent positions by the action of respective resilient means, not shown in the drawings. While the piston 228 of the actuator 212 is advanced, the corresponding movement of the cup member 230 causes the radial contraction of the take-up members 232 towards an annular abutment part 236 of the hollow shaft 222. Thus, as will be seen below, the take-up members 232 engage and retain the bent end d of the wires F located in correspondence with the wire-guiding unit 12.

As regards the gripper 220, when the piston 216 of the actuator 210 is in the advanced position, the gripper is open. The withdrawal of the piston 216 causes the gripper 220 to close and, as will be seen, to grip the portion $S_2$ of the shaft S of the rotor R located at the winding station, so as to render the tubular shaft 202 rigid with the rotor R for translation and rotation. In these conditions, the pressurized-fluid actuator 208 is de-energized so that the tubular shaft 202 with the gripper 220 and take-up members 232 is driven and follows the rotational and translational movements of the main unit 18 in the manner explained below.

The various actuators 178,182,208,210 and 212 also have associated position sensor devices for providing the electronic control unit 30 with indications relative to the positions of the various members of the auxiliary unit 20 controlled thereby. For the electrical connection of the sensors (which are of a type generally well known to experts in the art and will not therefore be described in detail), as well as for the supply of the various fluid actuators, an extensible support 238 is provided which is similar to the extensible support 172 of the main unit 18 and carries electrical conductors and flexible supply tubes.

Loading/unloading unit 22

With reference to FIGS. 5 to 7 and particularly 15 and 16, the loading/unloading unit 22 comprises a horizontal rail structure 242 carried by a support 243 fixed to the framework 10 on the side of the auxiliary units 20, and a carriage, generally indicated 244, is movable along it. The carriage 244 comprises an upper part 246 having rollers 248 in rolling engagement with the guide rail 242 and provided with an attachment 250 for connection to a drive chain 252 driven by an electric motor, not shown in the drawings. The attachment 250 is effectively constituted by an annular member through which a rod 253 is slidable axially and the ends of which carry bushes 254 for connection to the ends of the chain 252. Between the bushes 254 and the attachment 250 are two helical compression springs 256 which serve as dampers when the movement of the carriage 244 is stopped.

The upper part 246 carries a vertical pressurized-fluid actuator 258 the rod of which is connected to a vertically-movable plate 260 provided with a pair of vertical guide rods 262 slidable within respective guide members 264 carried by the parts 246.

A lower unit 266 is suspended from the plate 260 so as to be pivotable. In effect, this unit comprises two vertical side plates 268 articulated at their upper ends to the plate 260 about a horizontal pin 270 and kept in a vertical position by biasing springs 272. The plates 268 carry horizontal guide shafts 275 which pass slidably through respective guide members 277 carried by the plates 260 to allow transfer sliding of the unit 266 relative to the upper part 246, in the manner clarified below. This transfer sliding is driven by a pressurized-fluid actuator 280.

The two plates 268 carry beneath them a take-up unit 282 comprising a plate 284 rotatable about a pin 286 between a vertical raised position, illustrated in FIGS. 7 and 15, and a horizontal lowered position, illustrated in FIG. 16. The plate 284, the rotation of which is driven by a motor 288 carried by one of the side plates 268, carries two adjacent take-up and retaining gripper members 290 operated by respective pressurized-fluid actuators 292 arranged to grip the portions $S_2$ of the shafts S of the rotors R, in the manner clarified below.

The various movable members of the carriage 244 also have associated sensor devices for providing the electronic control unit 30 with signals indicative of the positions of these members.

The various electrical conductors and flexible tubes associated with the pressurized-fluid actuators of the unit 22 are carried by extensible supports 294,296 similar to the supports 172 and 238.

The carriage 244 of the unit 22 is movable along the guide 242 by means of the chain 252 between a position in which it is located in correspondence with the supply conveyor 24 (FIG. 5) and a position in which it is disposed in correspondence with the winding station 16 (FIG. 7). The feed device 24 is of known type and supplies the rotors R, which are disposed in vertical conditions on support slides 298, successively towards a position corresponding to that assumed by the carriage 244. In this position, the unit 266 is lowered by means of the actuator 258 and the plate 284 rotates into the lowered position by means of the motor 288 to allow the portion $S_2$ of the shaft S of a rotor R to be taken up by one of the two take-up members 290 driven by its respective actuator 292. The unit 266 is then raised again, the plate 284 rotates into its raised position, and the carriage 244 moves into correspondence with the winding station 16. In this position, the other of the two take-up members 290 takes up the rotor R on which the winding W has just been formed and, by means of the transfer stroke effected by the actuator 288, disposes the rotor R previously taken up from the feeder 24 at the winding station 16.

The carriage 244 is then moved towards the feeder 24 where the plate 284 is again rotated into the lowered position and the unit 266 is lowered by means of the actuator 258 to deposit the rotor R with the winding W on the support slide 298 from which the rotor R transferred to the winding station 16 was previously taken up. The actuator 280 then effects a new transfer stroke of the unit 266 to allow the taking-up of a new rotor R which, in the meantime, has been positioned at the take-up zone by the feeder 24, and the cycle is repeated again.

Operative forming cycle

The cycle of formation of the winding W on the rotor R positioned by the loading/unloading unit 22 at the winding station 16 will now be described below with particular reference to FIGS. 7 and 8 and 18 to 24.

When the rotor R on which the winding W is to be formed is transferred to the winding station 16, it is located with its shaft S aligned coaxially with the axis X, with its portion $S_1$ in line with the wire-guiding unit 12 and facing the main unit 18. In this phase, the slide 124 of the main unit 18 and the slide 174 of the auxiliary unit 20 are both held in a withdrawn position relative to the wire-guiding unit 12, that is, remote from the winding station 16 (FIG. 7).

At this point, the slide 124 of the main unit 18 is advanced so as to engage the shaft portion $S_1$ of the rotor R within the gripper member 162. By actuation of the latter, the portion $S_1$ is locked relative to the main unit 18 and the portion $S_2$ is released from the loading/unloading unit 22 which returns to the feeder 24 to operate in the manner described previously.

The rotor R is then positioned correctly by the main unit 18 within the wire-guiding unit 12 at the winding station 16, while the slide 174 of the auxiliary unit 20 is advanced on the opposite side to insert the shaft portion $S_2$ within the gripper member 220. The activation of the latter causes the gripping of the shaft portion $S_2$, which renders the tubular shaft 202 rigid for translation and rotation with the main unit 18 (FIG. 8). The rotor R is displaced angularly into the correct position for starting the winding cycle without the need for further adjustments or angular phasing.

At this point the cycle proper for forming the winding W starts.

The wires F projecting from the wire guides 38 towards the forming station 16 present themselves at the beginning of the cycle in an array with bent end parts for engagement by the take-up members 232 of the auxiliary unit 20. These bent end parts correspond in practice to the initial portions d of the winding W illustrated in FIGS. 1 and 2.

The first phase consists of the activation of the take-up members 232 by the advancement of the cup member 230, as a result of which the ends d of the wires F are clamped against the annular abutment 236 fixed to the tubular shaft 202 of the auxiliary unit 20. Following this, the actuator 208 is de-energized so that the tubular shaft 202 anchored to the rotor R and hooked automatically to the wires F may follow the entire subsequent movement of the main unit 18.

Figure 18:
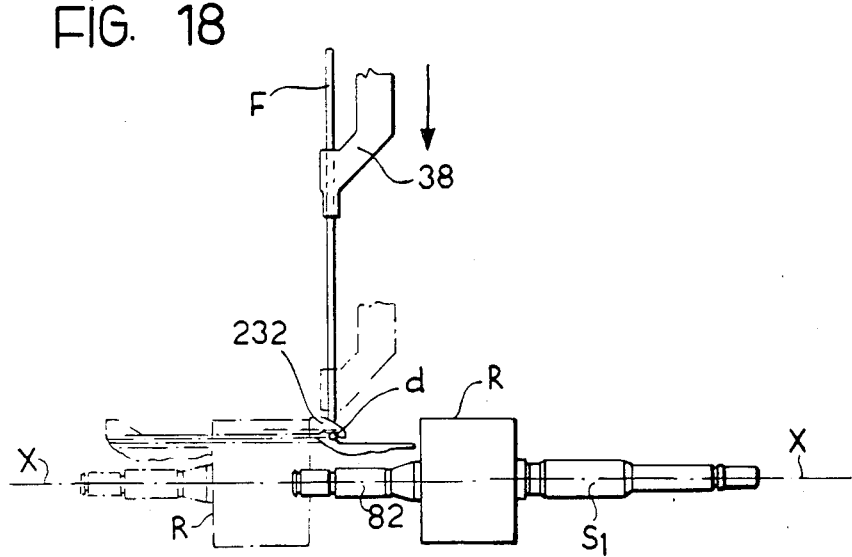

Starting from the position shown schematically in continuous outline in FIG. 18, the rotor R is advanced along the axis X towards the position indicated in broken outline in the same Figure, while the wire guides 38 advance simultaneously with respective wires F drawn by the auxiliary unit 20 by a length corresponding to the longitudinal portions b. As a result of the joint movement of the rotor R and the guide 38, the portions b are inserted axially within the slots A.

Figure 19:
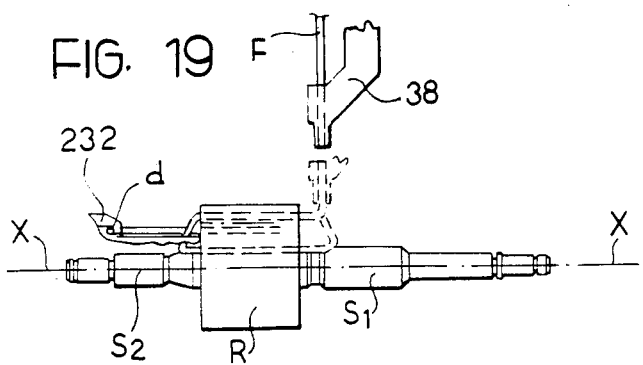

Subsequently, the wire guides 38 rise again through a distance corresponding to the length of the transverse portions e and are then lowered with the wire, while the rotor R is rotated so as to deposit this portion e close to the body c located closer to the portion $S_1$. During the rotation, the rotor R is also advanced through a short distance so that, in practice, this portion e is deposited in a helical configuration (FIG. 19).

Figure 20:
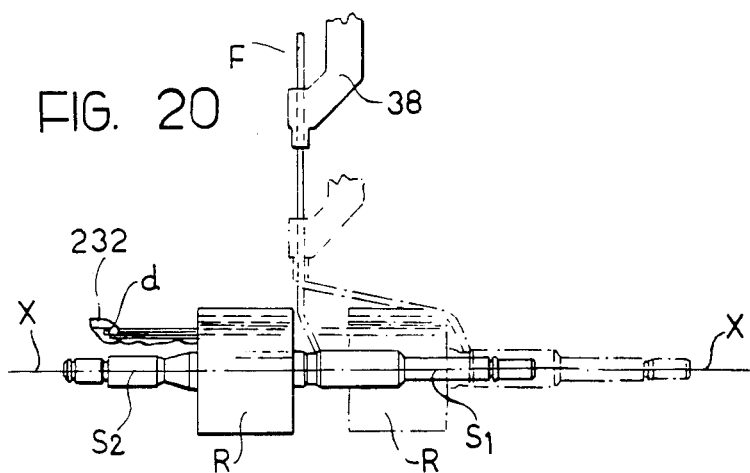

At this point, the longitudinal portion g is deposited in a manner identical to that described with reference to the portion e except for the fact that the rotor R is withdrawn from the position taken up in FIG. 19 and indicated in continuous outline in FIG. 20 to that indicated in broken outline in the same Figure. During this phase, the centering sleeve 154 is operated and effectively guides the portions g into the respective slots A and the blade pushers 76 of the wire-guiding unit 12 are also operated so that the portions g are arranged effectively within the slots A.

Figure 21:
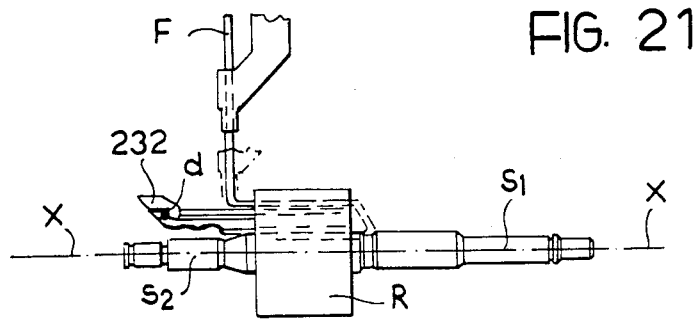
Figure 22:
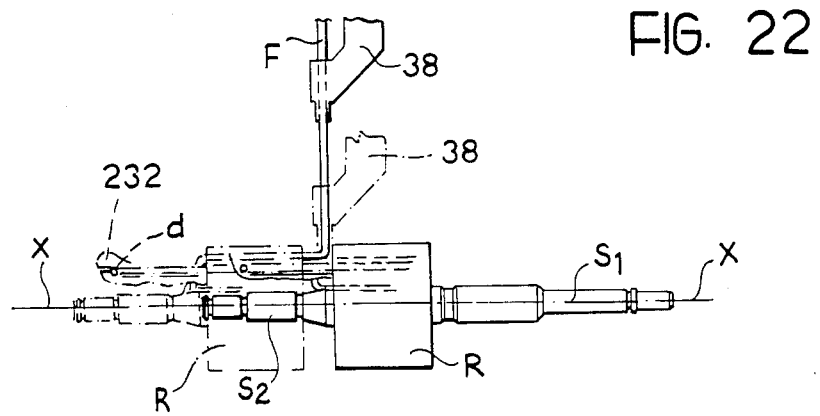
Figure 23:
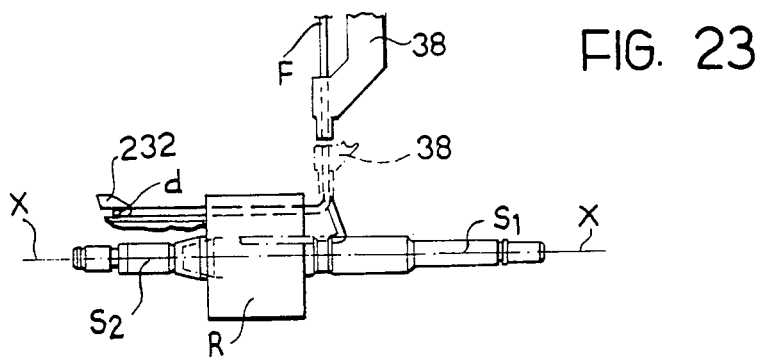

The transverse portions h are then deposited in a manner similar to that described with reference to the deposition of the portion e with the variation that the rotor R is obviously rotated in the opposite sense and at the same time withdrawn by the amount needed to make the portions h follow a helical path (FIG. 21).

Subsequently, the portions l are deposited in a manner identical to that described with reference to the portions b (FIG. 22), the transverse portions m in a manner identical to that described with reference to the portions e (FIG. 23) and, finally, the longitudinal portions n in a manner identical to that described with reference to the portions g (FIG. 24). In this latter phase, the blade pushers 77 of the wire-guiding unit 12 are operated again, this time twice so as to precede and follow the deposition of the portions n, and the centering sleeve 154 is operated and stopped in the advanced position.

The final phase consists of the cutting of the wires f at their radially bent ends p and is effected by the operation of the ring 190 carrying the blades 192, which is advanced by the translation of the slide 180 and then rotated by the displacement of the rack 196.

The rotor R with the winding W thus formed is then discharged by the deactivation of the take-up members 232 and the gripper member 220 of the auxiliary unit 20 and the removal of the latter from the winding station 16, the operation of the loading/unloading unit 22 in the manner explained above, and the deactivation of the gripper member 162 of the main unit 18 and its removal from the forming station 16.

After the removal of the rotor R with the winding W just formed, the wires F projecting into the winding station 16 are disposed in the arrayed configuration that precedes the beginning of the cycle, with bent end parts intended to constitute the take-up ends d for gripping by the take-up members 232 of the auxiliary unit 20 for the subsequent forming cycle on a new rotor R supplied to the station 16 by the unit 22.

As already explained above, all the phases of the above-described cycle, that is, all the movements of the movable members of the machine which carry out the cycle, are achieved completely automatically in a sequential cycle programmed by means of the electronic control unit 30, without the need for any direct manual intervention by the operators. Such intervention is limited solely to the removal of those causes which may generate any anomalies or malfunctions, signalled automatically by the various sensors and detectors with which the machine is provided and indicated visibly on the control panel of the control unit 30, as well as to the replacement of any empty spools T of wire F. This latter eventuality is also signalled automatically, as described above, by means of the sensors 114 associated with the wheels 108 for the wires F.

In addition to carrying out the winding cycle completely automatically, the machine according to the invention has the advantage of considerable flexibility in operation, by virtue of the fact that the cycle may be easily modified according to particular requirements by means of the programmable control unit 30 and the possible adaptation or substitution of some mechanical members in accordance with different dimensions of the bodies C of the rotors R or the number of slots A in these rotors R. These adaptations or substitutions are in any case limited to an extremely small number of components which are easily accessible (the splined sleeve 154 of the main unit 18, the take-up members 232, blades 192 and counter-blades 194 of the auxiliary unit 20, the plate 34 with the wire guides 38 of the wire-guiding unit 12) and may be carried out extremely easily and quickly without necessitating long down-times of the machine.

Naturally, the principle of the invention remaining the same, the constructional details and forms of embodiment may be varied widely with respect to that described and illustrated, without thereby departing from the scope of the present invention.

Thus, for example, the loading/unloading unit 22 described above could be replaced by a simpler unit illustrated in FIGS. 25 and 26. This unit, generally indicated 300, includes a horizontal support structure 302 carrying two superposed horizontal guides 303, 304 between which a screw 305 extends. The screw 305 is rotated by means of a motor 306 (FIG. 26) and a belt or chain transmission 307.

The screw 305 is engaged by a nut 308 carried by a carriage 309 movable along the guides 303,304. The carriage 309 carries two vertical guides 310 along which a plate 311 carrying a lower take-up unit, generally indicated 312, is movable vertically. The plate 311 is movable vertically along the guides 310 by means of a screw 313 rotated by an electric motor 314.

The lower unit 312 includes two take-up and retaining members 316 rotatable about a horizontal axis 315 between a raised horizontal position and a lowered vertical position illustrated in FIG. 25, by means of a rotation unit 317. The members 316 are arranged to retain the portions $S_2$ of the shafts S of the rotors R in the manner explained above.

This conformation ensures that the unit 22 has greater flexibility in use in that it allows it to be adapted easily to rotors R of different dimensions.

We claim:

1. In a machine for forming induction windings in rotors, having respective shafts and axial slots, of dynamo-electric machines such as electric motors, alternators and the like, of the type including a magazine of conductor wires wound on spools, a winding station, a wire-guiding unit with a horizontal axis including motor driven means for supplying an array of said conductor wires radially inwardly toward said axis from the magazine to the winding station, said winding station comprising take-up means operating to engage ends of the wires adjacent said axis, chuck means for gripping the shaft of the rotor and means for moving said chuck means longitudinally of the axis of the wire-guiding unit and rotating said chuck means about this axis in synchronism with the operation of the wire-guiding unit in an operative forming cycle during which each wire is deposited longitudinally within a respective first slot of the rotor, wound transversely at one end of the rotor between the first slot and a second slot which is not adjacent the first slot, deposited longitudinally within the second slot, wound transversely at the other end of the rotor between the second and first slots, redeposited longitudinally within the first slot, rewound transversely at the end of the rotor between the first and second slots, and redeposited longitudinally within the second slot, and in which there are provided radial pusher means associated with the wire-guiding unit for arranging the longitudinal portions of the wires within the respective slots, and cutting means for cutting the ends of the wires projecting from the second slots of the rotor at the end of the cycle and for forming these end parts into bent hooks adapted to cooperate with the take-up means in the subsequent cycle, the improvement comprising the take-up means for the ends of the wires comprise an annular gripper member having motor-driven means for its activation and deactivation, and motor means for translating the gripper member along the axis relative to the winding station, the gripper member having an associated attachment member for attachment to the shaft of the rotor at the end opposite the chuck means, said motor means being deactivatable when the ends of the shaft of the rotor are secured by said chuck means and said associated attachment member whereby the translation and rotation of the gripper member is carried out by the chuck means during the forming cycle, the machine further including motor-driven loading and unloading means for supplying the rotors to the winding station and removing them therefrom, respectively, in synchronism with the operation of the chuck means and the take-up means, and electronic means for controlling the wire-guiding unit, the take-up means, the chuck means, the cutting means, and the loading and unloading means in an automatic operating sequence.

2. Machine according to claim 1, comprising a motor-driven auxiliary unit carrying the cutting means and the said gripper member and the said associated attachment member.

3. Machine according to claim 2, wherein the auxiliary unit includes:
   a main slide and first motor-driven means for moving linearly the said main slide parallel to the axis of the wire-guiding unit,
   a support shaft coaxial with the wire-guiding unit and carrying the gripper member and the associated attachment member with their respective motor-driven activation and deactivation means at one end and provided at the other end with second motor-driven means for effecting its axial movements relative to the main slide;

a secondary slide slidable on the main slide, a tubular support which is carried by the secondary slide and surrounds the support shaft coaxially, and a rotatable tubular member having blades thereon carried by the said tubular support and respective fixed counter-blades carried by said tubular support, cooperating with said blades, third motor-driven means for effecting the sliding movement of the secondary slide relative to the main slide and the consequent axial movement of the tubular support relative to the support shaft, and fourth motor-driven means for rotating the rotatable ring relative to the tubular support.

4. Machine according to claim 2, wherein the gripper member includes a plurality of axial take-up members which can be contracted and expanded radially by means of the said motor-driven activation and deactivation means.

5. Machine according to claim 1, wherein the motor-driven loading and unloading means comprises a motor-driven conveyor device for the rotors, a guide structure and a motor-driven carriage reciprocal along the guide structure between first and second positions in which it is disposed in correspondence with the said motor-driven conveyor device and the forming station respectively, the carriage carrying a support which is rotatable between a raised position and a lowered position, said support being slidable relative to the carriage between first and second positions, and means for moving said support relative to said carriage vertically, the support carrying two take-up and retaining members for the shafts of two rotors provided with respective motor-driven activation and deactivation means, and motor-driven means being provided for effecting rotational movements of the support.

6. Machine according to claim 5, wherein the motor-driven means for effecting the movement of the carriage along the guide structure comprise a chain transmission, an attachment member of the carriage to which the said chain transmission is slidably anchored, and resilient clamping members between said chain transmission and the said attachment member.

7. Machine according to claim 1, wherein the wire-guiding unit comprises an annular support member, a series of reciprocable radial wire guides carried by said support member, means for reciprocating said wire guides, each of said wire guides having an associated wire-straightening roller unit and a respective one-way clamp for making each wire fast with the respective wire guide solely in the sense corresponding to the advance of the wire towards the winding station, respective racks to which the said wire guides are fixed, respective sprockets meshing with said racks, and a motor-driven gear for simultaneously rotating said sprockets, each wire guide having an associated blade pusher movable radially to penetrate a respective slot in the rotor, cam means cooperating with said blade pusher and motor-driven means for rotating the said cam means in synchronism with the operation of the gear to move said blade pusher radially.

8. Machine according to claim 1, wherein the chuck means include:

a slide movable linearly parallel to the axis of the wire-guiding unit, first motor-driven means for moving the slide, a tubular support carried by the slide and rotatable coaxially with the wire-guiding unit, and second motor-driven means for rotating the said tubular support, an external hollow shaft mounted coaxially with and slidable on the tubular support and third motor-driven means for moving the said external hollow shaft, the external shaft carrying at its end facing the wire-guiding unit a sleeve having axial centering slots disposed like the slots in the rotor, an inner shaft mounted coaxially with and slidable within the tubular support and fourth motor-driven means for moving the said inner shaft, the inner shaft being rigid for rotation with the tubular support and carrying, at its end facing the wire-guiding unit, a gripper member for the shaft of the rotor driven by means of the fourth motor driven means.

9. Machine according to claim 1, wherein the magazine for supplying the conductor wires includes pillar support members provided with brackets for supporting the spools of wire located with axes substantially horizontal in substantially vertical rows, each spool having an associated rotatable member for feeding the wire towards the wire-guiding unit provided with phonic-wheel monitoring means for signalling anomalies.

10. Machine according to claim 1, wherein the motor-driven loading and unloading means include a guide structure and a carriage reciprocable along the guide structure, a motor driven screw-and-nut device, for reciprocating the said carriage between first and second positions in which it is disposed in correspondence with the said motor-driven conveyor device for the rotors and the forming station, respectively, the carriage carrying a support movable vertically, motor-driven control means for moving the said support and carrying beneath it a rotatable take-up unit including two take-up and retaining members for shafts of two rotors, motor-driven means being provided for rotating the take-up unit between a horizontal position and a vertical position of the take-up and retaining members.

* * * * *